United States Patent [19]

Yamane et al.

[11] Patent Number: 5,069,700

[45] Date of Patent: Dec. 3, 1991

[54] METHOD OF MANUFACTURING GRADIENT-INDEX GLASS

[75] Inventors: Masayuki Yamane, Yokohama; Atsuo Yasumori, Mitaka, both of Japan

[73] Assignee: President of Tokyo Institute of Technology, Tokyo, Japan

[21] Appl. No.: 667,582

[22] Filed: Mar. 11, 1991

[30] Foreign Application Priority Data

Apr. 12, 1990 [JP] Japan .................................... 2-95055

[51] Int. Cl.⁵ .......................... C03C 1/00; C03B 19/06
[52] U.S. Cl. ......................................... 65/17; 65/18.1; 65/18.3; 65/30.13; 501/12
[58] Field of Search ................. 65/3.11, 17, 18.1, 18.3, 65/30.13, DIG. 901; 501/12

[56] References Cited

U.S. PATENT DOCUMENTS

| | | | |
|---|---|---|---|
| 4,397,666 | 8/1983 | Mishima et al. | 65/18.3 |
| 4,419,115 | 12/1983 | Johnson et al. | 65/901 |
| 4,422,965 | 12/1983 | Chickering et al. | 501/12 X |
| 4,441,905 | 4/1984 | Malmendier et al. | 65/901 |
| 4,454,237 | 6/1984 | Hoda et al. | 501/12 X |
| 4,680,046 | 7/1987 | Matsuo et al. | 65/17 |
| 4,681,615 | 7/1987 | Toki et al. | 65/18.1 |
| 4,937,208 | 6/1990 | Yamamoto et al. | 501/12 |

Primary Examiner—Robert L. Lindsay
Attorney, Agent, or Firm—Oblon, Spivak, McClelland, Maier & Neustadt

[57] ABSTRACT

A method of manufacturing a large-diameter gradient-index glass having a predetermined refractive index gradient includes the steps of (a) hydrolyzing a solution consisting of an alkoxide of silicon and an alkoxide of boron to prepare a sol, (b) adding an aqueous solution of lead acetate and an organic acid to the sol to prepare a gel porous body, (c) aging and sequentially treating the gel porous body by using a water-isopropanol solution of lead acetate, an isopropanol-acetone solution, and acentone, thereby performing a pretreatment, (d) dipping the pretreated gel porous body into a lower alcohol solution of at least one of potassium acetate and sodium acetate to form a lead ion concentration distribution which is gradually changed from a surface to an interior of the gel porous body, (e) sequentially treating the gel porous body having the lead ion concentration distribution by sequentially using an isopropanol-acetone solution and acentone, and (f) drying and heating the gel porous body to prepare a glass body.

7 Claims, 1 Drawing Sheet

METHOD OF MANUFACTURING GRADIENT-INDEX GLASS

BACKGROUND OF THE INVENTION

1. Field of the Invention

The present invention relates to a method of manufacturing a gradient-index glass and, more particularly, to a method of manufacturing a large (large-diameter) body of a gradient-index glass effectively used as a general optical lens of a camera or a microscope or a pickup lens for an optical disk. 2. Description of the Related Art A gradient-index glass of this type is currently manufactured by an ion exchange method based on mutual diffusion of monovalent cations (e.g., thallium and potassium) in solid glass. A body of gradient-index glass manufactured in this manner and having a diameter of 1 to 2 mm is used in a lens array of a copying machine or a microlens for optical communication.

Since a diffusion rate of ions in solid glass in the above manufacturing method is very low, however, a large-diameter product for use in an optical system of a camera or the like cannot be manufactured.

For this reason, Published Unexamined Japanese Patent Application No. 63-2775 discloses a method of manufacturing a gradient-index glass in accordance with a sol-gel method using a silicon alkoxide as a main starting material as will be described below. First, a silicon alkoxide and a water-soluble salt (lead acetate) are used as starting materials to prepare a gel. Subsequently, the formed gel is aged, and water is removed from the gel. In this process, since the lead acetate in the gel is diffused toward the surface, this lead acetate in the gel is redissolved by a water-isopropanol solution mixture of lead acetate to cancel a concentration distribution caused by the diffusion, thereby obtaining a predetermined concentration. Subsequently, the resultant gel was treated by isopropanol to extract water in the gel. After these pretreatment steps, the gel is dipped in an aqueous potassium nitrate solution to externally diffuse and flow the lead acetate in pores of the gel, thereby obtaining a concentration distribution of the lead acetate. At the same time, potassium nitrate is diffused in the pore of the gel to compensate for a thermal expansion difference in the gel caused by the lead acetate concentration distribution. Subsequently, the gel is sequentially treated by using an isopropanol-solution and acetone to precipitate and fix the lead acetate and the potassium nitrate on the pore walls of the gel. Thereafter, the gel is dried in the air at room temperature and sintered to manufacture a gradient-index glass. Such a gradient-index glass manufacturing method, however, has the following problems.

That is, in the above manufacturing method, lead nitrate is added independently of lead acetate in order to obtain a homogeneous gel not containing bubbles by adjusting a reaction time. Since lead nitrate has a high solubility in a normal solvent, however, it is difficult to fix a concentration distribution of the lead.

In addition, in the pretreatment step, water required in gel formation is partially removed by evaporation in the air so as to easily fix the lead concentration distribution in the subsequent step. For this reason, the gel containing water deforms or cracks by its own weight in the water removal step. Furthermore, in the lead acetate concentration distribution formation step in which potassium nitrate is diffused in the pores of the gel to compensate for the thermal expansion difference in the gel caused by the lead acetate concentration distribution, it is difficult to obtain a concentration distribution of potassium nitrate opposite to that of lead acetate. For this reason, since the thermal expansion difference caused by the lead acetate concentration distribution cannot be canceled by potassium nitrate upon sintering, the gel may crack. This tendency occurs more conspicuously as the size of the gel is increased. As a result, the size of a glass body which can be manufactured is limited, i.e., a lens having a diameter of about 7 mm or more and a height of about 10 mm or more cannot be manufactured.

Moreover, in the lead acetate concentration formation step, lead acetate is present in the form of ions in the pores of the gel. When such a gel is dipped in an aqueous potassium nitrate solution, since the lead acetate flows out in the aqueous potassium nitrate solution within a short time, it is difficult to control the lead acetate concentration distribution. As a result, this difficulty and the difficulty in fixing the lead acetate concentration distribution described above make it impossible to manufacture a glass having a predetermined refractive index distribution.

SUMMARY OF THE INVENTION

It is an object of the present invention to provide a method capable of manufacturing a large (large-diameter) body of a glass (diameter = 10 mm or more) having a predetermined refractive index gradient with ease and high reproducibility.

According to the present invention, there is provided a method of manufacturing a gradient-index glass, comprising the steps of:

(a) hydrolyzing a solution consisting of an alkoxide of silicon and an alkoxide of boron to prepare a sol;

(b) adding an aqueous solution of lead acetate and an organic acid to the sol to prepare a gel porous body;

(c) aging and sequentially treating the gel porous body by using a water-isopropanol solution of lead acetate, an isopropanol-acetone solution, and acentone, thereby performing a pretreatment;

(d) dipping the pretreated gel porous body into a lower alcohol solution of at least one of potassium acetate and sodium acetate to form a lead ion concentration distribution which is gradually changed from a surface to an interior of the gel porous body;

(e) sequentially treating the gel porous body having the lead ion concentration distribution by using an isopropanol-acetone solution and acentone; and (f) drying and heating the gel porous body to prepare a glass body.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodi

DETAILED DESCRIPTION OF THE PREFERRED EMBODIMENTS

Figure 1:
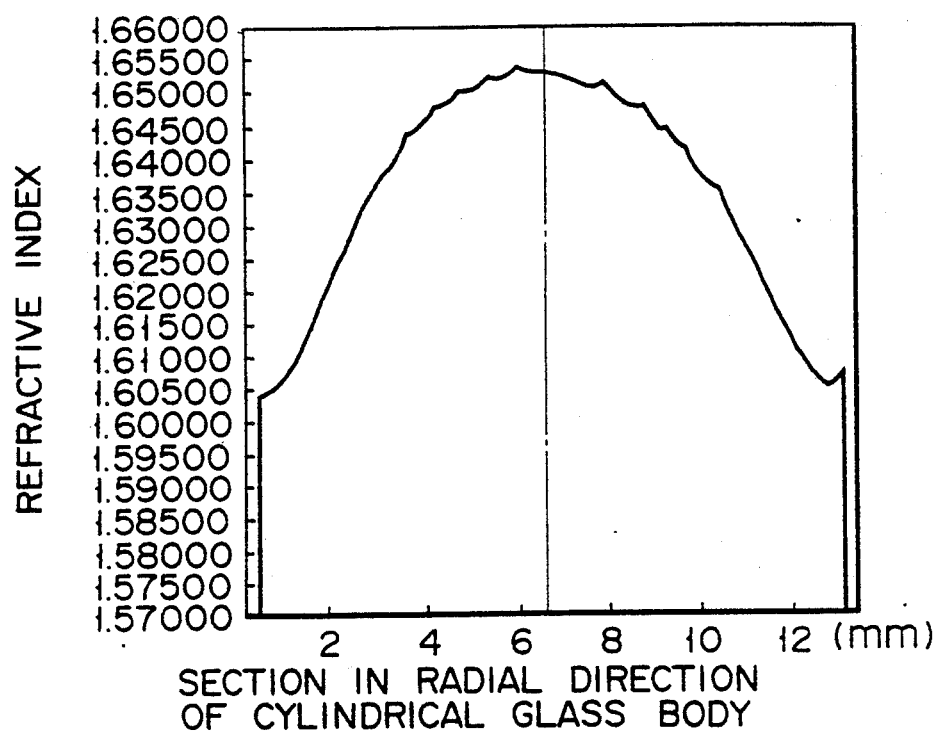
- FIG. 1 is a graph showing a refractive index distribution in the radial direction in a section of a cylindrical glass body manufactured in Example 1 of the present invention.

The present invention is a method of manufacturing a gradient-index glass, comprising the steps of:
(a) hydrolyzing a solution consisting of an alkoxide of silicon and an alkoxide of boron to prepare a sol;
(b) adding an aqueous solution of lead acetate and an organic acid to the sol to prepare a gel porous body;
(c) aging and sequentially treating the gel porous body by using a water-isopropanol solution of lead acetate, an isopropanol-acetone solution, and acentone, thereby performing a pretreatment;
(d) dipping the pretreated gel porous body into a lower alcohol solution of at least one of potassium acetate and sodium acetate to form a lead ion concentration distribution which is gradually changed from a surface to an interior of the gel porous body;
(e) sequentially treating the gel porous body having the lead ion concentration distribution by sequentially using an isopropanol-acetone solution and acentone; and
(f) drying and heating the gel porous body to prepare a glass body.

Examples of the silicon alkoxide used in the step (a) are tetramethoxysilane, tetraethoxysilane, and tetrabutoxysilane. Examples of the boron alkoxide are boron ethoxide and boron butoxide.

Examples of the organic acid used in the step (b) are acetic acid, maleic acid, and citric acid, and acetic acid is most preferable.

Although water in the water-isopropanol solution used in the step (c) is required to dissolve the added lead acetate, it is difficult to extract water in the gel porous body if the amount of water is too large. Therefore, the water concentration is preferably set to be 20% or less.

Examples of the lower alcohol used in the step (d) are methanol, ethanol, and propanol, and ethanol is most preferable.

The drying step (f) is preferably performed such that the gel porous body is placed in a vessel saturated with acetone vapor and is dried while acetone is gradually evaporated through small holes formed in a cover member of the vessel.

According to the present invention, a large (large-diameter) gel porous body in which lead acetate is fixed in pores with a predetermined concentration distribution and which has satisfactory strength can be prepared, and a large-diameter glass body (diameter=10 mm or more) having a predetermined refractive index distribution can be manufactured in the subsequent drying and heating step (f) without forming any cracks. The operation and effect of the present invention will be described below in accordance with the manufacturing steps.

Step (a)

By adding a boron alkoxide in this sol preparation step, a sintering temperature in glass formation can be lowered and production of cristobalite can be suppressed to manufacture transparent glass free from devitrification in the step (f).

Step (b)

Since a gelation time can be adjusted by adding an organic acid to the sol together with an aqueous solution of lead acetate, a large gel porous body not containing bubbles can be obtained.

Step (c)

By the treatment using a water-isopropanol solution of lead acetate performed in this pretreatment step, most of water contained in the gel porous body can be extracted, and the organic acid which is no longer necessary and has an adverse influence on the subsequent steps can be removed. In addition, a strength which does not cause the gel porous body to deform by its own weight in the subsequent drying step is imparted to the gel porous body. Furthermore, by adding the lead acetate in the water-isopropanol solution, an outflow of the ionized lead and acetic acid present in the pores of the gel porous body into the water-isopropanol solution can be replenished by lead acetate in the solution. As a result, the lead concentration of the gel porous body can be maintained at the level in an initial state.

Moreover, by the treatment using the isopropanol-acetone solution and acentone performed in the step (c), water in the gel porous body can be perfectly removed and fine crystals of lead acetate can be uniformly precipitated on pore walls of the gel porous body.

Step (d)

By dipping the gel porous body in a lower alcohol solution of one or both of potassium acetate and sodium acetate, the fine crystals of lead acetate precipitated on the pore walls of the gel porous body in the step (c) are gradually dissolved in the lower alcohol solution and flow outside, and the potassium acetate (or the sodium acetate) is diffused in the pores of the gel porous body. As a result, a concentration distribution of lead acetate (lead ions) which is gradually increased from the surface to the interior of the gel porous body can be formed. In addition, a concentration distribution of the potassium acetate (or the sodium acetate) which is gradually decreased from the surface to the interior of the gel porous body can be obtained. For this reason, a variation in thermal expansion coefficient of glass in the sintering process caused by the lead concentration distribution in the gel porous body can be compensated by potassium (or sodium) having an expansion coefficient close to that of lead.

Furthermore, since the fine crystals of lead acetate are precipitated on the pore walls of the gel porous body in the step (c), when the gel porous body is dipped in the lower alcohol solution, lead acetate can be prevented from abruptly flowing outside the gel porous body as in the case in which lead and acetic acid are present in the form of ions in the pores of the gel porous body. As a result, the lead acetate concentration distribution can be easily controlled.

Step (e)

In this step in which the gel porous body is sequentially treated by using the isopropanol-acetone solution and acentone, the lower alcohol which dissolves lead acetate is removed, and fine crystals of lead acetate and potassium acetate (or sodium acetate) are precipitated and fixed on the pore walls of the gel porous body in accordance with the concentration distribution described above.

Step (f)

In this step of drying and heating the gel porous body, lead is diffused in accordance with the above concentration distribution to manufacture glass having a refractive index distribution. In addition, formation of cracks caused by a difference between the thermal expansion coefficients can be prevented by the potassium acetate (or the sodium acetate) precipitated on the pore walls of the gel porous body and having a concentration distribution opposite to that of lead acetate.

Furthermore, by performing the drying step (f) such that the gel porous body is placed in a vessel saturated with acetone vapor and is dried while acetone is gradually evaporated through small holes formed in a cover member of the vessel, abrupt evaporation of acetone on the surface of the gel porous body can be prevented. As a result, an excellent gradient-index glass having no small cracks on its surface can be manufactured.

As described above, a large gel porous body having no bubbles can be obtained in the step (b); in the pretreatment step (c), water having an adverse influence on controllability of the lead concentration distribution is extracted from the gel porous body and water is no longer used as a solvent in the subsequent steps, a strength which does not cause the gel porous body to deform by its own weight upon drying is imparted to the gel porous body, and fine crystals of lead acetate are precipitated on pore walls of the gel porous body in order to improve controllability in lead acetate concentration distribution; in the step (d), a concentration distribution of lead acetate (lead ions) which is gradually increased from the surface to the interior of the gel porous body is formed, and potassium acetate (or sodium acetate) is diffused to compensate for a variation in thermal expansion coefficient of glass caused by the lead concentration distribution in the gel porous body by potassium (or sodium) having an expansion coefficient close to that of lead; and in the step (e), fine crystals of lead acetate and potassium acetate (or sodium acetate) are precipitated and fixed again on the pore walls of the gel porous body in accordance with the above concentration distribution. As a result, a large (large-diameter) gel porous body in which lead acetate is fixed in the pores with a predetermined concentration distribution and which has satisfactory strength can be manufactured. In the subsequent drying and heating step (f), therefore, a large-diameter glass body (diameter = 10 mm or more) having a predetermined refractive index distribution can be manufactured without forming cracks.

In addition, since the concentration distribution of lead acetate (lead ions) of the gel porous body can be controlled with high precision by adjusting a dipping time of the gel porous body into the lower alcohol solution in the step (d), glasses having different refractive index gradient can be manufactured by a simple operation.

DETAILED DESCRIPTION OF THE PREFERRED EMBODIMENTS

EXAMPLE 1

25 ml of an aqueous hydrochloric acid solution having a pH of 2 were added to a solution mixture consisting of 30 ml of tetramethoxysilane, 30 ml of tetraethoxysilane, and 12.4 ml of boron ethoxide to prepare a sol, and the prepared sol was left to stand until it was cooled to room temperature. Subsequently, a solution mixture consisting of 107.63 ml of 1.25-mol/l aqueous lead acetate solution and 15.35 ml of acetic acid was added to the sol, and the resultant sol was mixed by stirring and poured in a cylindrical polypropylene vessel having an inner diameter of 35 mm to a level of 50 mm. In this step, since a gelation time can be adjusted by addition of acetic acid, a large gel porous body without bubbles can be obtained.

Subsequently, the cylindrical vessel was sealed and stored at 30° C. for five days to strengthen the gel porous body by gelation and aging. The resultant gel porous body (diameter = 35 mm, height = 50 mm) was removed from the vessel and dipped in a 0.61-mol/l lead acetate solution containing isopropanol and water at a volume ratio of 8:2 at 60° C. for three days under stirring. In this step, most of water in the gel porous body was extracted, and acetic acid which was no longer necessary and would have an adverse influence on the subsequent steps was removed. In addition, a strength which did not cause the gel porous body to deform by its own weight in the subsequent drying step was imparted to the gel porous body. Subsequently, the gel porous body was dipped in a solution mixture containing isopropanol and acetone at a volume ratio of 8:2 at 30° C. for two days under stirring, dipped in a solution mixture containing isopropanol and acetone at a volume ratio of 5:5 at 30° C. for two days under stirring, and stored in acetone at 30° C. for two days. In this step, water in the gel porous body was perfectly removed, and fine crystals of lead acetate were uniformly precipitated on pore walls of the gel porous body.

The resultant gel porous body was then dipped in a 0.61-mol/l potassium acetate ethanol solution at 30° C. for four hours. In this step, the lead acetate fine crystals precipitated in the pores of the gel porous body were gradually dissolved, diffused in the pores, and flowed outside, thereby forming a concentration distribution of lead acetate which was gradually increased from the surface to the interior of the gel porous body. At the same time, potassium acetate was diffused in the pores of the gel porous body to form a concentration distribution opposite to that of lead acetate.

Subsequently, the gel porous body was dipped in a solution mixture containing isopropanol and acetone at a volume ratio of 5:5 and stored at 30° C. for two days, and then stored in acetone at 30° C. for two days. In this step, ethanol having high solubility of lead acetate was removed, fine crystals of lead acetate were precipitated again on the pore walls of the gel porous body in accordance with the concentration distribution described above, and fine crystals of potassium acetate were also precipitated on the pore walls of the gel porous body. Thereafter, the resultant gel porous body was placed on a base consisting of polytetrafluoroethylene and set in a glass vessel containing a small amount of acetone on its bottom, the vessel was sealed by an aluminum foil having small holes, and the gel porous body was dried while acetone was gradually evaporated through the small holes. In this step, since the small amount of acetone contained on the bottom of the vessel was evaporated to cover the gel porous body with saturated acetone vapor, abrupt evaporation of acetone in the gel porous body could be prevented, and the gel porous body was dried without forming cracks on its surface. In addition, since the gel porous body was placed on the polytetrafluoroethylene base, a friction resistance produced when the gel porous body shrank upon evaporation could be reduced.

Finally, the dried gel porous body having a diameter of about 20 mm and a height of 30 mm was heated to be vitrified in a tubular electric furnace. As the heating conditions, the temperature was increased from room temperature to 460° C. at a heating rate of 30° C./hr and held at 240° C. and 460° C. for 12 hours each, increased from 460° C. at a rate of 15° C./hr and held at 510° C. and 580° C. for 12 hours each, and decreased to room temperature at a rate of 100° C./hr. Oxygen gas was flowed at a flow rate of 50 ml/min. up to a temperature slightly higher than 460° C., and then helium gas was flowed in place of oxygen until cooling was started.

According to Example 1 of the present invention, a transparent cylindrical glass body having a diameter of 13 mm and a height of 20 mm and not containing bubbles was obtained.

FIG. 1 shows results obtained by measuring a refractive index gradient in the radial direction in a section of the cylindrical glass body. As shown in FIG. 1, the glass body has a parabolic distribution from the center to a distance of 6 mm, and a refractive index difference between the peripheral portion and the central portion was 0.05.

In addition, a cylindrical glass body was manufactured in accordance with the method described in Published Unexamined Japanese Patent Application No. 63-2775 in which an aqueous lead nitrate solution was used instead of acetic acid in a gel formation step and, as a pretreatment, water extraction using isopropanol and acetone was not performed but a gel was exposed to the air to remove a part of water. The diameter of the manufactured cylindrical glass body was 7 mm and its height was 10 mm. In such a method, since formation of a lead acetate concentration distribution in pores of the gel was not controlled well, it was difficult to manufacture a cylindrical glass body having a predetermined refractive index gradient. According to Example 1 of the present invention, since deformation of the gel porous body caused by its own weight in the pretreatment step and movement of lead ions were suppressed, a lens element having a large diameter and a refractive index difference between the central and peripheral portions could be manufactured.

EXAMPLE 2

Figure 2:
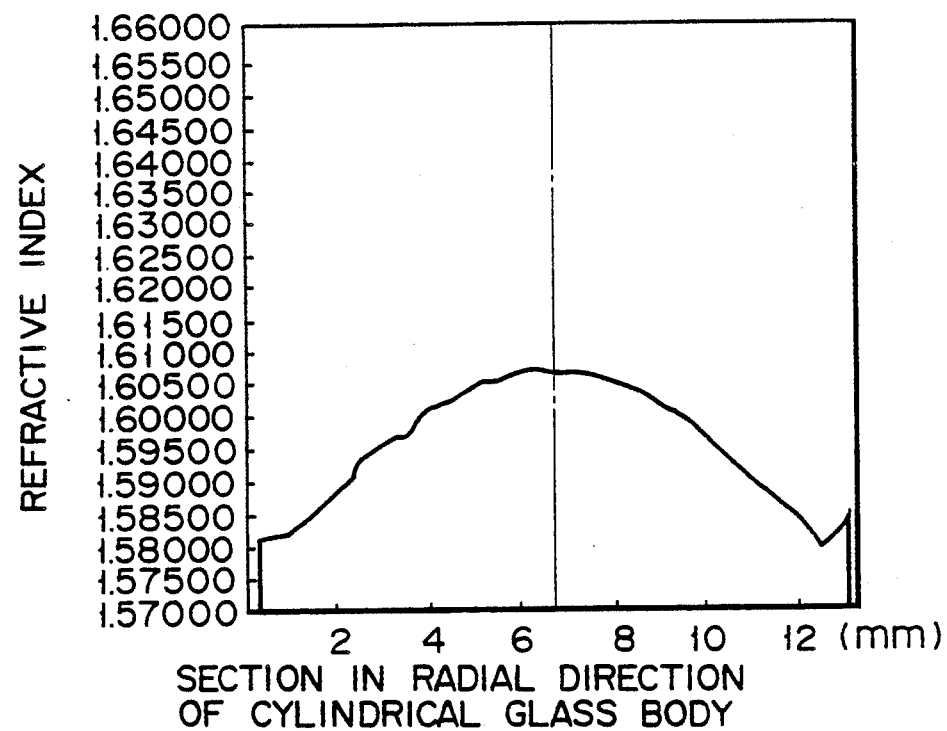
FIG. 2 is a graph showing a refractive index distribution in the radial direction in a section of a cylindrical glass body manufactured in Example 2 of the present invention.

A gel porous body having a diameter of 35 mm and a height of 50 mm in which fine crystals of lead acetate were precipitated on pore walls was formed following the same procedures as in Example 1. Subsequently, the obtained gel porous body was dipped in a 0.61-mol/l ethanol solution of potassium acetate and stored at 30° C. for 16 hours, and fixing of a lead concentration distribution, drying, and sintering were performed following the same procedures as in Example 1, thereby manufacturing a transparent cylindrical glass body having a diameter of 13 mm and a height of 20 mm. FIG. 2 shows results obtained by measuring a refractive index gradient in the radial direction in a section of the manufactured cylindrical glass body.

As is apparent from FIG. 2, the refractive index of the cylindrical glass body of Example 2 is high at the central portion and gradually lowered to the peripheral portion. The gradient of this refractive index distribution is different from that of the cylindrical glass body of Example 1. These results reveal that the refractive index gradient can be precisely controlled by adjusting a dipping time of the gel porous body into the ethanol solution of potassium acetate.

In each of the above examples, acetic acid was used as an organic acid in the gel porous body formation step. A large-diameter glass body having a refractive index gradient similar to those obtained in the examples, however, can be manufactured by using citric acid or maleic acid instead of acetic acid.

In addition, although an ethanol solution of potassium acetate was used in the lead ion concentration distribution formation step, a large-diameter glass body having a refractive index gradient similar to those obtained in the above examples can be manufactured by using a methanol or propanol solution of potassium acetate; a methanol, ethanol, or propanol solution of sodium acetate; or a methanol, ethanol, or propanol solution of sodium acetate and potassium acetate.

As has been described above, according to the present invention, a large (large-diameter) glass body (diameter = 10 mm or more) having a predetermined refractive index gradient can be manufactured with ease and high reproducibility and effectively used as a general optical lens of a camera or a microscope or a pickup lens for an optical disk.

What is claimed is:

1. A method of manufacturing a gradient-index glass, comprising the steps of:
    (a) hydrolyzing a solution consisting of an alkoxide of silicon and an alkoxide of boron to prepare a sol;
    (b) adding an aqueous solution of lead acetate and an organic acid to said sol to prepare a gel porous body;
    (c) aging and sequentially treating said gel porous body by sequentially using a water-isopropanol solution of lead acetate, an isopropanol-acetone solution, and acentone, thereby performing a pretreatment;
    (d) dipping said pretreated gel porous body into a lower alcohol solution of at least one of potassium acetate and sodium acetate to form a lead ion concentration distribution which is gradually changed from a surface to an interior of said gel porous body;
    (e) sequentially treating said gel porous body having the lead ion concentration distribution by sequentially using an isopropanol-acetone solution and acentone; and
    (f) drying and heating said gel porous body to prepare a glass body.

2. A method according to claim 1, wherein said alkoxide of silicon is tetramethoxysilane.

3. A method according to claim 1, wherein said alkoxide of boron is boron ethoxide.

4. A method according to claim 1, wherein said organic acid is acetic acid.

5. A method according to claim 1, wherein a concentration of water in said water-isopropanol solution is not more than 20%.

6. A method according to claim 1, wherein said lower alcohol is ethanol.

7. A method according to claim 1, wherein said drying step (f) is performed such that said gel porous body is placed in a vessel saturated with acetone vapor and is dried while acetone is gradually evaporated through small holes formed in a cover member of said vessel.

* * * * *